(12) United States Patent
Hashimoto

(10) Patent No.: US 6,423,396 B2
(45) Date of Patent: Jul. 23, 2002

(54) LAMINATED POLYESTER FILM

(75) Inventor: Kiyokazu Hashimoto, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/810,492

(22) Filed: Mar. 19, 2001

(30) Foreign Application Priority Data

Mar. 27, 2000 (JP) ........................................ 2000-086825
Mar. 27, 2000 (JP) ........................................ 2000-086826
Mar. 27, 2000 (JP) ........................................ 2000-086827

(51) Int. Cl.$^7$ ........................ B32B 27/06; B32B 27/18; B32B 27/20; B32B 27/36
(52) U.S. Cl. ........................ 428/141; 428/212; 428/213; 428/323; 428/480; 528/308; 528/308.1; 528/308.6
(58) Field of Search ................................. 428/141, 212, 428/213, 323, 480, 694.56; 528/308, 308.1, 308.6

(56) References Cited

U.S. PATENT DOCUMENTS 5,374,467 A * 12/1994 Sato ........................ 264/176.1
5,529,832 A *  6/1996 Masuda et al. ............. 428/212
5,753,377 A *  5/1998 Takahashi et al. .......... 428/458

\* cited by examiner

Primary Examiner—Vivian Chen
(74) Attorney, Agent, or Firm—Burns, Doane, Swecker & Mathis, LLP

(57) ABSTRACT

A laminated polyester film excellent in scratch resistance having a surface elastic modulus of 5 GPa to 15 GPa on at least one side thereof.

13 Claims, No Drawings

LAMINATED POLYESTER FILM

FIELD OF THE INVENTION

The present invention relates to a laminated polyester film high in surface elastic modulus and excellent in scratch resistance, preferably excellent in transparency, optical characteristics and handling characteristics.

BACKGROUND OF THE INVENTION

Polyester films represented by polyethylene terephthalate films have hitherto been widely used as transparent films because of their good transparency and low cost. However, they are poor in scratch resistance, so that the improvement thereof has been desired.

As methods for improving the scratch resistance of polymer films, methods of forming hard coat layers on surfaces of the films as described below have generally well known:

(1) Methods of applying radiation-curing resins onto the surfaces (for example, JP-A-11-254867 (the term "JP-A" as used herein means an "unexamined published Japanese patent application"));

(2) Methods of forming metal oxide films on the surfaces by vapor deposition (JP-A-11-77909); and (3) Methods of forming silicon oxide films by sol-gel processes (for example, JP-A-11-279305).

However, in order to improve the scratch resistance all the methods are required to thicken the hard coat layers, which causes the disadvantages of being liable to crack in bending and of being liable to deteriorate the scratch resistance. Further, the hard coat layers are formed after the formation of the polyester films, so that the number of production steps increases to raise cost. It has therefore been desired that these disadvantages are overcome. Further, high transparency, high optical characteristics and high handling characteristics such as high bending resistance have also been desired.

For such purposes, the laminated polyester films of the invention are laminated with layers to which fine particles are added, and such constitution is also seen in polyester films for magnetic recording materials (for example, JP-A-5-169604 and JP-A-3-86542). However, in these polyester films, thin layers containing large-sized fine particles are laminated for improving running properties, and surfaces of the polyester films are uneven. These polyester films are therefore different from those of the invention requiring smooth surfaces. Further, these polyester films are thinner in thickness and smaller in the amount of fine particles added than those of the invention. Accordingly, improvement in scratch resistance due to improvement in surface elastic modulus is not achieved.

SUMMARY OF THE INVENTION

An object of the invention is to provide a laminated polyester film excellent in scratch resistance, preferably excellent in transparency, optical characteristics and handling characteristics.

The object of the invention has been attained by the following invention:

(1) A laminated polyester film having a surface elastic modulus of 5 GPa to 15 GPa on at least one side thereof;

(2) The laminated polyester film described in (1), wherein the film has a total light transmittance of 70% to 98% and a haze of 0% to 2%;

(3) The laminated polyester film described in (1), wherein the film has a number of voids developed of 100 or less per 10 $\mu$m square;

(4) The laminated polyester film described in (1), wherein the film has a center-line roughness Ra of 0 $\mu$m to 0.01 $\mu$m and a maximum height Rt of 0 $\mu$m to 0.5 $\mu$m, on the surface on at least one side thereof;

(5) The laminated polyester film described in (1), wherein a polyester layer (hereinafter referred to as "layer B") containing fine particles having a size of 1 nm to 400 nm in an amount of 10% to 60% by weight based on the weight of layer B is laminated on at least one side of a polyester support (hereinafter referred to as "layer A");

(6) The laminated polyester film described in (5), wherein the film has a total layer thickness of 10 $\mu$m to 300 $\mu$m and a thickness of layer B of 5 $\mu$m to 100 $\mu$m;

(7) The laminated polyester film described in (5), wherein the ratio of the particle size D of the fine particles to the thickness Tb of layer B, D/Tb, is from $10^{-3}$ to $10^{-5}$;

(8) The laminated polyester film described in (5), wherein the ratio of the particle size D of the fine particles to the thickness Tb of layer B, D/Tb, is from less than $1 \times 10^{-2}$ to $1 \times 10^{-5}$;

(9) The laminated polyester film described in (1), wherein the difference in surface elastic modulus between the front and back sides is from 0.5 GPa to 10 GPa;

(10) The laminated polyester film described in (1), wherein the polyester is a polyethylene terephthalate resin or a polyethylene naphthalate resin;

(11) The laminated polyester film described in (1), wherein the film has an unevenness in thickness of 0% to 3% in a machine direction MD and in a transverse direction TD;

(12) The laminated polyester film described in (1), wherein the film has a breaking elongation of 10% to 200% both in a machine direction MD and in a transverse direction TD; and

(13) The laminated polyester film described in (1), wherein the rate of thermal dimensional change at 100° C. for 30 minutes is from 0% to 0.3% both in a machine direction MD and in a transverse direction TD, and the unevenness in thickness in, a machine direction MD and in a transverse direction TD is from 0% to 3%.

DETAILED DESCRIPTION OF INVENTION

According to the invention, the surface elastic modulus of the polyester film is increased on at least one side thereof, thereby achieving improvement in scratch resistance. The surface elastic modulus of the polyester is preferably from 5 GPa to 15 GPa, more preferably from 5.5 GPa to 12 GPa, and still more preferably from 6 GPa to 10 GPa.

The total light transmittance of the polyester film is preferably from 70% to 98%, more preferably from 80% to 98%, and still more preferably from 85% to 98%. The haze is preferably from 0% to 2%, more preferably from 0% to 1.2%, and still more preferably from 0% to 0.7%. For achieving the high optical characteristics of the invention, the above-mentioned total light transmittance and haze are preferred.

Further, in the invention, the unevenness in thickness in a machine direction (MD) and in a transverse direction (TD) is preferably from 0% to 3%, more preferably from 0% to 2.5%, and still more preferably from 0% to 2.0%.

For improving bending properties to achieve high handling characteristics, the number of voids developed is preferably 100 or less, more preferably 50 or less, and still more preferably 20 or less, per 10 μm square (10 μm×10 μm). Further, the breaking elongation is preferably from 10% to 200%, more preferably from 20% to 180%, and still more preferably from 40% to 160%.

Further, in the invention, it has been found that the destruction of the film starts from the unevenness and projections on the surface thereof. That is to say, smoothening of the surface is preferred for improving the scratch resistance. The center-line roughness Ra of the surface of the polyester film is preferably from 0 μm to 0.01 μm, more preferably from 0 μm to 0.005 μm, and still more preferably from 0 μm to 0.001 μm, and the maximum height Rt of the surface of the polyester film is preferably from 0 μm to 0.5 μm, more preferably from 0 μm to 0.3 μm, and still more preferably from 0 μm to 0.1 μm, on at least one side thereof.

Further, the rate of thermal shrinkage at 100° C. for 30 minutes of the polyester film of the invention is preferably from 0% to 0.3%, more preferably from 0% to 0.25%, and still more preferably from 0% to 0.2%, thereby being able to prevent the long-term age shrinkage of the film when it is adhered to an exothermic body such as a surface of a television screen. Furthermore, in the invention, the unevenness in thickness of the film in a machine direction (MD) and in a transverse direction (TD) is preferably from 0% to 3%, more preferably from 0% to 2.5%, and still more preferably from 0% to 2.0%.

Such polyester films are obtained by kneading of fillers and improvement in film formation methods. The polyesters are formed from dicarboxylic acids and diols, and 50 mol % to 100 mol % of the total dicarboxylic acid residues preferably consists of aromatic dicarboxylic acids. More preferably, 70 mol % to 100 mol % of the dicarboxylic acid residues contained in the total dicarboxylic acid residues consists of naphthalenedicarboxylic acid residues and/or phthalic acid residues, and still more preferably, 80 mol % to 100 mol % of the dicarboxylic acid residues contained in the total dicarboxylic acid residues consists of 2,6-naphthalenedicarboxylic acid residues and/or terephthalic acid residues. As to the diols, the amount of ethylene glycol residues contained in the total diol residues is preferably from 50 mol % to 100 mol %, more preferably from 70 mol % to 100 mol %, and still more preferably from 80 mol % to 100 mol %.

Preferred specific examples of the polyesters include but are not limited to the following polymers:

(1) Example of Homopolymer

HP-1: Polyethylene-2,6-naphthalate (PEN)
HP-2: Polyethylene terephthalate (PET)

(2) Examples of Copolymers

|  | Composition (molar ratio) |
|---|---|
| CP-1: 2,6-NDCA/TPA/EG | (20/80/100) |
| CP-2: 2,6-NDCA/IPA/EG | (80/20/100) |
| CP-3: 2,6-NDCA/TPA/EG | (80/20/100) |
| CP-4: TPA/EG/BPA.2EO | (100/25/75) |
| CP-5: TPA/EG/CHDM/BPA.2EO | (100/25/25/50) |
| CP-6: TPA/EG/CHDM | (100/80/20) |

(wherein NDCA indicates naphthalenedicarboxylic acid, TPA indicates terephthalic acid, IPA indicates isophthalic acid, BPA.2EO indicates ethylene oxide (2 mol) addition product of bisphenol A, CHDM indicates cyclohexanedimethanol, and EG indicates ethylene glycol.)

(3) Examples of Polymer Blends

|  | Composition (molar ratio) |
|---|---|
| PB-1: PEN/PET | (20/80) |
| PB-2: PAr/PET | (15/85) |
| PB-3: PAr/PCT/PET | (15/10/75) |
| PB-4: PAr/PC/PET | (10/10/80) |

(wherein PEN indicates polyethylene naphthalate, PET indicates polyethylene terephthalate, PAr indicates polyarylate, PCT indicates polycyclohexanedimethanol terephthalate, and PC indicates polycarbonate.)

The intrinsic viscosity of these polymers is preferably from 0.4 dl/g to 0.8 dl/g, more preferably from 0.45 dl/g to 0.7 dl/g, and still more preferably from 0.5 dl/g to 0.7 dl/g.

Such polyesters are produced by heating dicarboxylic acid diesters (usually dimethyl esters) and diols of starting materials at a temperature of from 150° C. to 250 ° C. at atmospheric pressure in the presence of ester interchange catalysts, allowing them to react with each other for 0.5 hour to 5 hours while removing methanol, a by-product, by distillation, and gradually raising the degree of vacuum from atmospheric pressure to 40 Pa (0.3 torr) at a temperature of 250° C. to 290° C. to polycondense them with stirring. These polyesters can be synthesized with reference to descriptions of Kobunshi Jikkengaku (Polymer Experiments), Vol. 5, "Jushukugo to Jafuka (Polycondensation and Polyaddition)", pages 103 to 136 (Kyoritsu Shuppan, 1980) and "Goseikobunshi (Synthetic Polymers) V", pages 187 to 286 (Asakura Shoten, 1971), JP-A-5-163337, JP-A-3-179052, JP-A-2-3420and JP-A-1-275628. The polyesters thus polymerized are taken out, cooled with water, and solidified in the noodle form, followed by cutting to pellets.

In the invention, the fine particles having a size of preferably 1 nm to 400 nm, more preferably 5 nm to 200 nm, still more preferably 10 nm to 100 nm are added to the polyesters in an amount of preferably 10% to 60% by weight, more preferably 15% to 50% by weight, still more preferably 20% to 45% by weight, based on the total weight of the layer in which the fine particles are added.

Preferred examples of the fine particles include fine inorganic particles such as silica, alumina, titania, zirconia, mica, talc, calcium carbonate, barium sulfate, zinc oxide, magnesium oxide, calcium sulfate and kaolin, and fine organic particles such as crosslinked polystyrene. More preferred are silica, alumina, titania, zirconia, mica, talc and calcium carbonate. The form thereof may be any of amorphous, tabular and spherical forms. Further, two or more kinds of particles may be used as a mixture.

These fine particles may be added either together with monomers before polymerization of the polyesters or after polymerization of the polyesters. However, the former causes an increase in viscosity during polymerization, which sometimes makes it difficult to control polymerization. Accordingly, the latter is more preferred, because the fine particles are easy to be uniformly dispersed.

In the invention, such fine particles extremely small in size are uniformly dispersed at a high concentration. That is to say, the fine particles are added to a melt of an oligomer of the polyester in which the fine particles are dispersed to previously coat surfaces of the fine particles with the oligomer. The intrinsic viscosity of the oligomer is preferably from 0.05 dl/g to 0.4 dl/g, more preferably from 0.1 dl/g to 0.3 dl/g, and still more preferably from 0.1 dl/g to 0.2 dl/g. The ratio (P/O) of the fine particles (P) to the oligomer (O)

is preferably from 1 to 100, more preferably from 3 to 50, and still more preferably from 5 to 20. The fine particles can be mixed with the oligomer by use of a Banbury mixer, a kneader, a roll mill, or a single- or double-screw extruder. The mixing temperature is preferably from 100° C. to 350° C., more preferably from 120° C. to 300° C., and still more preferably from 150° C. to 250° C. The mixing time is preferably from 1 minute to 200 minutes, more preferably from 2 minutes to 100 minutes, and still more preferably from 3 minutes to 30 minutes.

Then, the fine particles thus treated are kneaded with the polyester. For kneading, a Banbury mixer, a kneader, a roll mill, or a single- or double-screw extruder can be used. The mixing temperature is preferably from 200° C. to 350° C., more preferably from 240° C. to 340° C., and still more preferably from 260° C. to 330° C. The mixing time is preferably from 1 minute to 200 minutes, more preferably from 2 minutes to 100 minutes, and still more preferably from 3 minutes to 30 minutes. At this time, a dispersing agent such as a metal salt of a higher fatty acid, a higher fatty acid ester such as a higher fatty acid ethyl ester, a higher fatty acid amide or a higher fatty acid, or an antioxidant is preferably used in combination.

The polyester containing such fine particles may be formed into a single-layer film, but is preferably used as a laminated film, thereby giving the difference in surface elastic modulus between the frond and back sides of the film, which is preferably from 0.5 GPa to 10 GPa, more preferably from 0.8 GPa to 7 GPa, and still more preferably from 1.0 GPa to 5 GPa. When the surface hardness is high on both sides, the holding force to a transfer roll is decreased, resulting in a tendency to generate scratches by slippage during film formation. Such a laminated film may be a laminate (B/A) in which a polyester layer (layer B) containing the fine particles is laminated on one side of a polyester layer (layer A) whose fine particle content is lower than that of layer B, or a laminate (B/A/B') in which a polyester layer (layer B') whose fine particle content is lower than that of layer B is laminated on layer A opposite to layer B.

It is preferred that a polyester used for layer A is basically the same as that used for layer B, and addition of fine particles is also preferred. The fine particles having a size of preferably 1 nm to 1000 nm, more preferably 5 nm to 600 nm, still more preferably 10 nm to 40 nm are added in an amount of preferably 0% to 1% by weight, more preferably 0.0001% to 0.1% by weight, still more preferably 0.001% to 0.01% by weight. Although the fine particles described for layer B can be used, materials for the fine particles of layer A and B may be the same or different.

A polyester and fine particles similar to those of layer B can be used for layer B', and the surface hardness of layer B' can be reduced by adding the fine particles in an amount smaller than that of layer B.

The total layer thickness of the polyester film of the invention is preferably from 10 μm to 300 μm, more preferably from 50 μm to 260 μm, and still more preferably from 100 μm to 250 μm. The thickness of layers B and B' is preferably from 5 μm to 100 μm, more preferably from 10 μm to 80 μm, and still more preferably from 20 μm to 50 μm.

The ratio (D/Tb) of the particle size (D) of the fine particles to the thickness (Tb) of layers B and B' is preferably from $1\times10^{-5}$ to less than $1\times10^{-2}$, more preferably from $1\times10^{-4}$ to $5\times10^{-2}$, and still more preferably from $1\times10^{-4}$ to $1\times10^{-3}$.

The polyester films of the invention can be formed in the following manner.

(1) Drying of Polyester Resins

Polyester pellets are dried at a temperature of 100° C. to 250° C., preferably 130° C. to 200° C. for 5 minutes to 5 hours, preferably 10 minutes to 1 hour.

(2) Melt Extrusion

Pellets for layers A, B and B' are each supplied to single- or multiple-screw kneading extruders, and then melted. In this case, pellets to which a desired amount of the fine particles are added from the beginning may be used, or pellets to which the fine particles are previously added at a high concentration (master pellets) may be diluted with pellets to which no fine particles are added to adjust the concentration of the fine particles to a desired value.

The extrusion temperature is from 250° C. to 350° C., and preferably from 260° C. to 340° C., and the polymer is allowed to stay in the extruder for 1 minute to 30 minutes, preferably for 3 minutes to 15 minutes. It is preferred that the melted polymer is then previously filtered through a filter. The filters include screen, sintered screen, sintered metal, sand and glass fiber. The filter size is preferably from 1 μm to 30 μm.

The melted polymer is extruded through a T die. When the laminated film is produced, each component is extruded through a T die having a laminated structure (such as a multi-manifold die). This is solidified on a casting drum of 40° C. to 100° C. to prepare an unstretched film. At this time, the adhesion to the drum can be improved by electrostatic application or water film formation (application of a fluid such as water onto the casting drum to improve the adhesion of the melt to the drum) to preferably improve the flat surface property of the film. This is separated from the drum to form an unstretched sheet.

(3) MD Stretching

The unstretched sheet is stretched in the machine direction (MD). The stretching ratio is preferably from 2.5 times to 4 times, and more preferably from 3 times to 4 times. The stretching temperature is preferably from 70° C. to 160° C., more preferably from 80° C. to 150° C., and still more preferably from 80° C. to 140° C. The stretching speed is preferably from 10%/second to 300%/second, more preferably from 30%/second to 250%/second, and still more preferably from 50%/second to 200%/second. Such MD stretching can be carried out by transferring the unstretched sheet between a pair of rolls different from each other in peripheral speed.

(4) TD Stretching

The stretching ratio is preferably from 2.5 times to 5 times, more preferably from 3 times to 4.5 times, and still more preferably from 3.3 times to 4.3 times. The stretching temperature is preferably from 75° C. to 165° C., more preferably from 80° C. to 160° C., and still more preferably from 85° C. to 155 ° C. The stretching speed is preferably from 10%/second to 300%/second, more preferably from 30%/second to 250%/second, and still more preferably from 50%/second to 200%/second. The TD stretching can be achieved by chucking both edges of the film, transferring the film into a tenter, and widening the width thereof.

(5) Heat Setting

The heat setting temperature is preferably from 190° C. to 275° C., more preferably from 210° C. to 270° C., and still more preferably from 230° C. to 270° C. The treating time is preferably from 5 seconds to 180 seconds, more preferably from 10 seconds to 120 seconds, and still more preferably from 15 seconds to 60 seconds.

It is preferred that the film is relaxed 0% to 10% in the transverse direction during the heat setting. The relaxation is more preferably from 0% to 8%, and still more preferably from 0% to 6%.

Such heat setting and relaxation can be achieved by chucking both edges of the film, transferring the film into a heat-setting zone, and narrowing the width thereof.

(6) Winding

After the heat setting, the film is cooled, trimmed and wound on a roll. At this time, it is also preferred that edges of the support are subjected to knurling. The width of the film is preferably from 0.5 m to 10 m, more preferably from 0.8 m to 8 m, and still more preferably from 1 m to 6 m.

The polyester films of the invention can be further improved in light transparency, haze and unevenness in thickness by forming the films in the same manner as described above with the exception that MD stretching described in (3A) and TD stretching described in (4A) are employed.

(3A) MD Stretching

The unstretched sheet is stretched in the machine direction (MD), and the stretching ratio is preferably from 2.5 times to 4.0 times, more preferably from 2.7 times to 4.0 times, and more preferably from 3.0 times to 4.0 times. In the invention, the unstretched sheet may be stretched in multiple steps. It is preferred that the second stretching ratio is larger than the first stretching ratio, and the ratio (the second stretching ratio/the first stretching ratio) of the second stretching ratio to the first stretching ratio is preferably from 1.1 to 3.1, more preferably from 1.2 to 2.5, and still more preferably from 1.3 to 2.1.

The stretching temperature is preferably from 80° C. to 160° C., more preferably from 85° C. to 150° C., and still more preferably from 90° C. to 140° C. At this time, it is preferred that the second stretching temperature is higher than the first stretching temperature, and the difference in temperature is preferably from 2° C. to 20° C., more preferably from 3° C. to 15° C., and still more preferably from 4° C. to 12° C.

The stretching speed in MD stretching is preferably from 10%/second to 300%/second, more preferably from 30%/second to 250%/second, and still more preferably from 50%/second to 200%/second. At this time, it is preferred that the second stretching speed is higher than the first stretching speed, and the stretching speed ratio (the second stretching speed/the first stretching speed) is preferably from 1.1 to 3, more preferably from 1.2 to 2.5, and still more preferably from 1.3 to 2.

Such MD stretching can be carried out by transferring the unstretched film between a pair of rolls different from each other in peripheral speed. In this case, the film is heated with a preheating drum or an infrared heater. In the case of multiple-step stretching, such sets are arranged in tandem, and the revolutions of the respective rolls are adjusted, thereby realizing the multiple-step stretching different in stretching speed. The stretching temperature in each step can be changed by adjusting the preheating drum or the infrared heater installed in each step.

(4A) TD Stretching

The stretching ratio is preferably from 2.5 times to 5 times, more preferably from 3 times to 4.5 times, and still more preferably from 3.3 times to 4.3 times. The stretching temperature is preferably from 82° C. to 187° C., more preferably from 92° C. to 160° C., and still more preferably from 85° C. to 155° C. The stretching speed is preferably from 10%/second to 300%/second, more preferably from 30%/second to 250%/second, and still more preferably from 50%/second to 200%/second. The TD stretching can be achieved by chucking both edges of the film, transferring the film into a tenter, and widening the width thereof.

The polyester films of the invention can be further improved in optical characteristics and handling characteristics by forming the films in the same manner as described above with the exception that MD stretching described in (3B) and TD stretching described in (4B) are employed.

(3B) MD Stretching

The unstretched sheet is stretched in the machine direction (MD), and the stretching ratio is preferably from 2.5 times to 4.0 times, more preferably from 2.7 times to 4.0 times, and more preferably from 3.0 times to 4.0 times. In the invention, the unstretched sheet may be stretched in multiple steps. It is preferred that the second stretching ratio is larger than the first stretching ratio, and the ratio (the second stretching ratio/the first stretching ratio) of the second stretching ratio to the first stretching ratio is preferably from 1.1 to 3.1, more preferably from 1.2 to 2.5, and still more preferably from 1.3 to 2.1.

The stretching temperature is preferably from 100° C. to 160° C., more preferably from 110° C. to 150° C., and still more preferably from 120° C. to 140° C. At this time, it is preferred that the second stretching temperature is higher than the first stretching temperature, and the difference in temperature is preferably from 2° C. to 20° C., more preferably from 3° C. to 15 ° C., and still more preferably from 4° C. to 12° C.

The stretching speed in MD stretching is preferably from 10%/second to 300%/second, more preferably from 30%/second to 250%/second, and still more preferably from 50%/second to 200%/second. At this time, it is preferred that the second stretching speed is higher than the first stretching speed, and the stretching speed ratio (the second stretching speed/the first stretching speed) is preferably from 1.1 to 3, more preferably from 1.2 to 2.5, and still more preferably from 1.3 to 2.

Such MD stretching can be carried out by transferring the unstretched film between a pair of rolls different from each other in peripheral speed. In this case, the film is heated with a preheating drum or an infrared heater. In the case of multiple-step stretching, such sets are arranged in tandem, and the revolutions of the respective rolls are adjusted, thereby realizing the multiple-step stretching different in stretching speed. The stretching temperature in each step can be changed by adjusting the preheating drum or the infrared heater installed in each step.

(4B) TD Stretching

The stretching ratio is preferably from 2.5 times to 5 times, more preferably from 3 times to 4.5 times, and still more preferably from 3.3 times to 4.3 times. In this case, the TD stretching is more preferably carried cut in two or more divided steps. At this time, it is preferred that the second stretching ratio is larger than the first stretching ratio, and the ratio (the second stretching ratio/the first stretching ratio) of the second stretching ratio to the first stretching ratio is preferably from 1.1 to 2.8, more preferably from 1.2 to 2.3, and still more preferably from 1.3 to 2.1.

The stretching temperature is preferably from 82° C. to 165° C., more preferably from 87° C. to 160° C., and still more preferably from 92° C. to 155° C. At this time, it is preferred that the second stretching temperature is higher than the first stretching temperature, and the difference in temperature is preferably from 2° C. to 20° C., more preferably from 3° C. to 15° C., and still more preferably from 4° C. to 12° C.

The stretching speed in TD stretching is preferably from 10%/second to 300%/second, more preferably from 30%/second to 250%/second, and still more preferably from 50%/second to 200%/second. At this time, it is preferred that the second stretching speed is higher than the first stretching speed, and the stretching speed ratio (the second stretching speed/the first stretching speed) is preferably from 1.3 to 3, more preferably from 1.4 to 2.7, and still more preferably from 1.5 to 2.4.

Such stretching can be achieved by chucking both edges of the film, transferring the film into a tenter, and widening the width thereof. In the case of multiple-step stretching, the stretching speed can be varied by transferring the film through a plurality of tenter zones, and changing the length of each zone. Further, the stretching temperature can be varied by changing the temperature of each tenter zone.

It is also preferred that the polyester support thus prepared is subjected to surface treatment. The surface treatment processes include chemical treatment, mechanical treatment, corona treatment, flame treatment, ultraviolet treatment, high frequency treatment, glow treatment, active plasma treatment, laser treatment, mixed acid treatment and ozone oxidation treatment. Of these, corona treatment, ultraviolet treatment, glow treatment and flame treatment are particularly effective. These can be performed according to methods described in JIII Journal of Technical Disclosure No. 94-6023, Japan Institute of Invention and Innovation.

It is also preferred that an antistatic layer is provided on the support. The antistatic agents include metal oxides, conductive metals, carbon fiber, π conjugate polymers (such as polyarylenevinylenes) and ionic compounds, which have a volume resistivity of $10^7$ Ωcm or less, preferably $10^6$ Ωcm or less, and more preferably $10^5$ Ωcm or less.

The antistatic agents are preferably conductive metal oxides and derivatives thereof. Of these, the conductive materials particularly preferably used are crystalline metal oxide particles, which include ZnO, $TiO_2$, $SnO_2$, $Al_2O_3$, $In_2O_3$, $SiO_2$, MgO, BaO, $MoO_3$ and $V_2O_5$. Particularly preferred are conductive materials containing $SnO_2$ as a main component, about 5% to about 20% of antimony oxide and/or another component (such as silicon oxide, boron or phosphor). Details of these conductive materials and coating methods thereof are described in JIII Journal of Technical Disclosure No. 94-6023, Japan Institute of Invention and Innovation, and the conductive materials can be applied to the supports according to them.

Finally, evaluation and measuring methods employed in the invention will be described.

(1) Surface Elastic Modulus

Using a micro-surface hardness meter (Fischer Scope H100VP-HCU manufactured by Fischer Instruments), a Vickers penetrator is brought into contact with a surface of a sample, and then, the load is increased to 1 mN for 10 seconds. This state is kept or 5 seconds. The penetrating depth of the Vickers penetrator at this time is taken as Dv0. Then, the load is decreased to 0 mN, and the force pushing back the Vickers penetrator (Fv) and the penetrating depth (Dv) at this time are measured. The gradient thereof is taken as the surface elastic modulus. That is to say, when Dv is plotted as abscissa and Fv as ordinate, the absolute value of the gradient between Dv0 and 0.9×Dv0 for Dv is taken as the surface elastic modulus. This measurement is made in the atmosphere of 25° C. and 60% RH, and the average value is determined from 10 measurements.

(2) Center-Line Roughness (Ra)

A portion having a reference length L (2.5 mm) is cut out from a cross-sectional curve (roughness curve) of a film obtained with a surface roughness tester (SE-3F manufactured by Kosaka Laboratory Ltd.), in a direction of a center line thereof. When represented by a roughness curve Y=f(X) taking a center line of this portion as the X axis and a direction of the MD stretching ratio as the Y axis, a value given by, the following equation (1) is indicated by μm (in accordance with JIS-B0601-1994). The center-line roughness (Ra) is expressed as the average value of the center-line average roughness of the cut-out portion determined from 10 cross-sectional curves obtained from a surface of the sample film. The tip radius of a feeler is 2 μm, the load is 30 mg, and the cut-off value is 0.08 mm.

$$Ra = \frac{1}{L}\int_0^L |f(x)|dx \qquad (1)$$

(3) Maximum Height (Rt)

A portion having a reference length (2.5 mm) is cut out from a cross-sectional curve of a film obtained with a surface roughness tester (SE-3F manufactured by Kosaka Laboratory Ltd.). When the maximum point and the minimum point are placed between two straight lines parallel to an average line of this portion, the spacing therebetween is expressed by μm, and the average value of 10 measurements is determined as Rt. In this measurement, a feeler having a tip radius of 2 μm is used, the load is 30 mg, and the cut-off value is 0.08 mm.

(4) Total Light Transmittance

The total light transmittance is measured in accordance with JIS-K6714-1995.

(5) Haze

The haze is measured in accordance with JIS-K6714-1995.

(6) Unevenness in Thickness (a) MD Unevenness in Thickness 35 mm×1 m samples are collected from a center portion in a transverse direction and both right and left portions each apart 35% of the whole width from the center, and measured with a continuous thickness meter (an electronic micrometer manufactured by Anritsu Corp.) at 600 mm/minute. The difference between the maximum point and the minimum point is taken as the unevenness in thickness.

(b) TD Unevenness in Thickness

A 35 mm×1 m sample is collected from between both right and left portions each apart 35% of the whole width from the center, and measured with the continuous thickness meter in the same manner as for the MD uneveness in thickness. The difference between the maximum point and the minimum point is taken as the unevenness in thickness.

(7) Number of Voids Developed

A section of a sample film is cut with a glass knife. For a highly concentrated fine particle-containing layer (layer B) thereof, 10 fields of view of 10 μm square (square fields of view with one side 10 μm long) are photographed at a magnification of 5000 using a scanning electron microscope (SEM). The number of voids developed in the vicinity of the fine particles (filler) is counted with the naked eye, and standardized by the photographed area to convert it to the number of voids per 10 μm square.

(8) Breaking Elongation

A sample is cut out to a size 350 mm long in MD and 10 mm wide in TD, and a size 150 mm long in TD and 10 mm wide in MD. The former is called an MD sample, and the latter a TD sample. Each sample is longitudinally stretched at a distance between chucks of 20 mm, at a stretching speed of 2 mm/minute in an atmosphere of 25° C. and 60% RH. The length (L) on breakage is determined, and the breaking elongation (%) is calculated from 100×(L-20)/20.

(9) Rate of Thermal Dimensional Change at 100° C. for 30 Minutes (i) A sample is cut out to a size 25 cm long in MD and 5 cm wide in TD, and a size 5 cm long in MD and 25 cm wide in TD. The former is called an MD sample, and the latter a TD sample.

(ii) After conditioned in an atmosphere of 25° C. and 60% RH for 12 hours or more, each sample is perforated to form pin holes spaced 20 cm apart, and the length is measured with a pin gauge (taken as L1).

(iii) The sample is placed without tension in a temperature controlled air bath at 100° C. for 30 minutes.

(iv) After the sample is taken out and conditioned in an atmosphere of 25° C. and 60% RH for 12 hours or more, the length is measured with a pin gauge (taken as L2).

(v) The value obtained by dividing the absolute value of the difference between L1 and L2 by L1 and multiplying the resulting value by 100 is taken as the rate of thermal dimensional change (%).

The invention will be illustrated with reference to examples below, but these are not to be construed as limiting the invention. Unless otherwise indicated, all parts are by weight.

EXAMPLES 1 TO 25 and

Comparative Examples 1 to 3

(1) Polymerization of Polyesters (a) Polyethylene Terephthalate (PET)

Dimethyl terephthalate (80 parts), 58 parts of ethylene glycol, 0.029 parts of manganese acetate tetrahydrate and 0.028 parts of antimony trioxide were mixed, and the resulting mixture was heated to 200° C. with stirring. The temperature was elevated to 235° C. while removing methanol generated as a by-product. After the generation of methanol was completed, 0.03 part of trimethyl phosphate was added thereto. Then, the pressure was reduced to 40 Pa (0.3 Torr) while elevating the temperature to 285° C., thus obtaining PET having an intrinsic viscosity of 0.62 dl/g by polymerization.

(b) Polyethylene Naphthalate (PEN) Dimethyl 2,6-naphthalenedicarboxylate (100 parts), 58 parts of ethylene glycol, 0.029 parts of manganese acetate tetrahydrate and 0.028 parts of antimony trioxide were mixed, and the resulting mixture was heated to 200° C. with stirring. The temperature was elevated to 235° C. while removing methanol generated as a by-product. After the generation of methanol was completed, 0.03 part of trimethyl phosphate was added thereto. Then, the pressure was reduced to 40 Pa (0.3 Torr) while elevating the temperature to 285° C., thus obtaining PEN having an intrinsic viscosity of 0.58 dl/g by polymerization.

The intrinsic viscosity of these polyesters was measured by the following method.

(i) The polyester is dissolved in a mixed solvent of phenol/1,1,2,2-tetrachloroethane (weight ratio: 60/40) to prepare 0.2 g/dl, 0.6 g/dl and 1.0 g/dl solutions.

(ii) The viscosity of the solutions is measured with an Ubbelohde viscometer at 20° C.

(iii) The viscosity is plotted against the concentration, and extrapolated to a concentration of 0. The resulting viscosity is taken as the intrinsic viscosity (dl/g).

(2) Kneading of Fine Particle

PET oligomers and PEN oligomers having the intrinsic viscosity (IV) described in Table 1 were prepared by decreasing the polymerization time in the above-mentioned methods. They were each added to fine particles as described in Table 1, and the resulting mixtures were each kneaded at 230° C. for 5 minutes by use of a Bandury mixer.

After dried at 150° C. for 30 minutes, the above-mentioned PET having a viscosity of 0.62 dl/g and PEN having a viscosity of 0.58 dl/g were each kneaded therewith for 5 minutes using a single-screw kneading extruder whiles elevating the temperature from 280° C. to 320° C. The kneaded products were each extruded in the noodle form, followed by cooling and cutting to form pellets.

TABLE 1

Dispersion of Fine Particles

| Pellet | Fine Particle Material | Size (nm) | Oligomer Material | IV* (dl/g) | FP/OG Ratio** (wt %) | Polyester Material | FP/PE Ratio*** (wt %) |
|---|---|---|---|---|---|---|---|
| 1 | Silica | 10 | PET | 0.1 | 8 | PET | 30 |
| 2 | Silica | 100 | PET | 0.2 | 18 | PET | 20 |
| 3 | Alumina | 40 | PEN | 0.07 | 10 | PEN | 40 |
| 4 | Alumina | 200 | PET | 0.25 | 30 | PET | 25 |
| 5 | Talc | 150 | PEN | 0.15 | 50 | PEN | 50 |
| 6 | Titania | 380 | PET | 0.39 | 90 | PET | 12 |
| 7 | Calcium Carbonate | 5 | PET | 0.05 | 2 | PET | 58 |
| 8 | Silica | 500 | PET | 0.45 | 0.8 | PET | 0.9 |
| 9 | Silica | 0.3 | PET | 0.03 | 120 | PET | 65 |
| 10 | Alumina | 100 | PEN | 0.10 | 8 | PEN | 0.0002 |
| 11 | Silica | 800 | PET | 0.18 | 15 | PET | 0.005 |
| 12 | Talc | 200 | PET | 0.30 | 70 | PET | 0.02 |
| 13 | — | — | — | — | — | PET | 0 |
| 14 | Titania | 1200 | PET | 0.50 | 120 | PET | 1.5 |

*IV: Intrinsic Viscosity
**FP/OG Ratio: Fine Particle/Oligomer Ratio
***FP/PE Ratio: Fine Particle/Polyester Ratio (3) Formation of Polyester Films The pellets prepared by the above-mentioned method were dried at 160° C. under reduced pressure for 3 hours. The pellets having each composition were melted in an 4extruder at 310° C., filtered through a 5-μm mesh filter, and the an extruded through a T die (multi-manifold die) onto an electrostatically charged casting drum kept at 50° C. to prepare an unstretched film, so as to provide each constitution shown in Tables 2 to 4.

TABLE 2

Conditions of Film Formation

|  | Layer Const. | Pellet (Shown in Table 1) | Thickness* (μm) | Fine Particle Size Thickness Ratio | MD Stretching Ratio | MD Stretching Temp. (° C.) | TD stretching Ratio | TD stretching Temp. (° C.) | Heat Setting Temp. (° C.) | Heat Setting Relaxation (%) |
|---|---|---|---|---|---|---|---|---|---|---|
| Example 1 | B | 1 | 30 | $3.3 \times 10^{-4}$ | 3.5 | 105 | 4.0 | 110 | 245 | 3 |
|  | A | 11 | 150 | — |  |  |  |  |  |  |
|  | B' | — | — | — |  |  |  |  |  |  |
| Example 2 | B | 2 | 45 | $2.2 \times 10^{-3}$ | 3.0 | 90 | 3.7 | 95 | 250 | 1 |
|  | A | 12 | 200 | — |  |  |  |  |  |  |
|  | B' | — | — | — |  |  |  |  |  |  |
| Example 3 | B | 3 | 20 | $2.0 \times 10^{-3}$ | 2.6 | 130 | 2.8 | 135 | 265 | 0 |
|  | A | 10 | 120 | — |  |  |  |  |  |  |
|  | B' | — | — | — |  |  |  |  |  |  |
| Example 4 | B | 4 | 60 | $3.3 \times 10^{-3}$ | 3.2 | 110 | 3.6 | 120 | 255 | 0.5 |
|  | A | 11 | 250 | — |  |  |  |  |  |  |
|  | B' | — | — | — |  |  |  |  |  |  |
| Example 5 | B | 5 | 20 | $7.5 \times 10^{-3}$ | 3.0 | 145 | 3.5 | 155 | 260 | 2 |
|  | A | 10 | 100 | — |  |  |  |  |  |  |
|  | B' | — | — | — |  |  |  |  |  |  |
| Example 6 | B | 7 | 10 | $5.0 \times 10^{-4}$ | 2.8 | 100 | 2.6 | 105 | 200 | 5 |
|  | A | 12 | 40 | — |  |  |  |  |  |  |
|  | B' | 6 | 10 | $3.8 \times 10^{-2}$ |  |  |  |  |  |  |
| Example 7 | B | 7 | 90 | $5.6 \times 10^{-5}$ | 3.3 | 115 | 3.0 | 130 | 180 | 8 |
|  | A | 13 | 200 | — |  |  |  |  |  |  |
|  | B' | — | — | — |  |  |  |  |  |  |
| Example 8 | B | 6 | 12 | $3.2 \times 10^{-2}$ | 3.1 | 105 | 3.4 | 110 | 220 | 3 |
|  | A | 11 | 100 | — |  |  |  |  |  |  |
|  | B' | — | — | — |  |  |  |  |  |  |
| Example 9 | B | 1 | 40 | $2.5 \times 10^{-4}$ | 3.5 | 110 | 4.0 | 115 | 250 | 2 |
|  | A | 10 | 120 | — |  |  |  |  |  |  |
|  | B' | — | — | — |  |  |  |  |  |  |
| Comparative Example 1 | B | 8 | 8 | $6.3 \times 10^{-2}$ | 3.3 | 105 | 3.7 | 110 | 245 | 2 |
|  | A | 14 | 5 | — |  |  |  |  |  |  |
|  | B' | 9 | 35 | $8.6 \times 10^{-6}$ |  |  |  |  |  |  |

*Thickness: Thickness After Film Formation

TABLE 3

Conditions of Film Formation

|  | Layer Const. | Pellet (Shown in Table 1) | Thickness* (μm) | Fine Particle/Size Thickness Ratio | MD Stretching First Step Ratio | MD Stretching First Step Temp. (° C.) | MD Stretching Second Step Ratio | MD Stretching Second Step Temp. (° C.) | TD stretching Ratio | TD stretching Temp. (° C.) | Heat Setting Temp. (° C.) | Relaxation (%) |
|---|---|---|---|---|---|---|---|---|---|---|---|---|
| Example 10 | B | 1 | 30 | $3.3 \times 10^{-4}$ | 1.4 | 100 | 2.4 | 105 | 3.9 | 110 | 245 | 2.8 |
|  | A | 11 | 150 | — |  |  |  |  |  |  |  |  |
|  | B' | — | — | — |  |  |  |  |  |  |  |  |
| Example 11 | B | 2 | 45 | $2.2 \times 10^{-3}$ | 1.5 | 80 | 2.0 | 98 | 3.7 | 97 | 252 | 1.2 |
|  | A | 12 | 200 | — |  |  |  |  |  |  |  |  |
|  | B' | — | — | — |  |  |  |  |  |  |  |  |
| Example 12 | B | 3 | 20 | $2.0 \times 10^{-3}$ | 1.5 | 120 | 1.7 | 130 | 2.8 | 139 | 263 | 0 |
|  | A | 10 | 120 | — |  |  |  |  |  |  |  |  |
|  | B' | — | — | — |  |  |  |  |  |  |  |  |
| Example 13 | B | 4 | 60 | $3.3 \times 10^{-3}$ | 1.2 | 112 | 2.6 | 114 | 3.2 | 84 | 258 | 0.4 |
|  | A | 11 | 250 | — |  |  |  |  |  |  |  |  |
|  | B' | — | — | — |  |  |  |  |  |  |  |  |
| Example 14 | B | 5 | 20 | $7.5 \times 10^{-3}$ | 1.6 | 148 | 2.1 | 155 | 3.4 | 162 | 260 | 1.8 |
|  | A | 10 | 100 | — |  |  |  |  |  |  |  |  |
|  | B' | — | — | — |  |  |  |  |  |  |  |  |
| Example 15 | B | 7 | 10 | $5.0 \times 10^{-4}$ | 1.1 | 105 | 3.4 | 115 | 4.5 | 126 | 200 | 4.5 |
|  | A | 12 | 40 | — |  |  |  |  |  |  |  |  |
|  | B' | 6 | 10 | $3.8 \times 10^{-2}$ |  |  |  |  |  |  |  |  |
| Example 16 | B | 7 | 90 | $5.6 \times 10^{-5}$ | 1.2 | 90 | 2.3 | 96 | 3.1 | 106 | 180 | 8.2 |
|  | A | 13 | 200 | — |  |  |  |  |  |  |  |  |
|  | B' | — | — | — |  |  |  |  |  |  |  |  |
| Example | B | 6 | 12 | $3.2 \times 10^{-2}$ | 1.2 | 100 | 2.8 | 110 | 3.4 | 110 | 220 | 3 |

TABLE 3-continued

Conditions of Film Formation

| | Layer Const. | Pellet (Shown in Table 1) | Thickness* (μm) | Fine Particle/Size Thickness Ratio | MD Stretching First Step Ratio | MD Stretching First Step Temp. (° C.) | MD Stretching Second Step Ratio | MD Stretching Second Step Temp. (° C.) | TD stretching Ratio | TD stretching Temp. (° C.) | Heat Setting Temp. (° C.) | Heat Setting Relaxation (%) |
|---|---|---|---|---|---|---|---|---|---|---|---|---|
| 17 | A | 11 | 100 | | | | | | | | | |
| | B' | — | — | | | | | | | | | |
| CE** 2 | B | 8 | 8 | $6.3 \times 10^{-2}$ | 1.5 | 100 | 2.0 | 105 | 3.6 | 115 | 240 | 2 |
| | A | 14 | 5 | — | | | | | | | | |
| | B' | 9 | 35 | $8.6 \times 10^{-6}$ | | | | | | | | |

*Thickness: Thickness After Film Formation
**CE: Comparative Example

TABLE 4

Conditions of Film Formation

| | Layer Const. | Pellet (Shown in Table 1) | Thickness (After Film Formation) (μm) | Fine Particle Size/ Thickness Ratio |
|---|---|---|---|---|
| Example 18 | B | 1 | 30 | $3.3 \times 10^{-4}$ |
| | A | 11 | 150 | — |
| | B' | — | — | — |
| Example 19 | B | 2 | 45 | $2.2 \times 10^{-3}$ |
| | A | 12 | 200 | — |
| | B' | — | — | — |
| Example 20 | B | 3 | 20 | $2.0 \times 10^{-3}$ |
| | A | 10 | 120 | — |
| | B' | — | — | — |
| Example 21 | B | 4 | 60 | $3.3 \times 10^{-3}$ |
| | A | 11 | 250 | — |
| | B' | — | — | — |
| Example 22 | B | 5 | 20 | $7.5 \times 10^{-3}$ |
| | A | 10 | 100 | — |
| | B' | — | — | — |
| Example 23 | B | 7 | 10 | $5.0 \times 10^{-4}$ |
| | A | 12 | 40 | — |
| | B' | 6 | 10 | $3.8 \times 10^{-2}$ |
| Example 24 | B | 7 | 90 | $5.6 \times 10^{-5}$ |
| | A | 13 | 200 | — |
| Example 25 | B | 6 | 12 | $3.2 \times 10^{-2}$ |
| | A | 11 | 100 | — |
| | B' | — | — | — |
| Comparative Example 3 | B | 8 | 8 | $6.3 \times 10^{-2}$ |
| | A | 14 | 5 | — |
| | B' | 9 | 35 | $8.6 \times 10^{-6}$ |

| | Film Formation by Stretching | | | | | | | | | |
|---|---|---|---|---|---|---|---|---|---|---|
| | MD Stretching | | | | TD Stretching | | | | Heat Setting | |
| | First Step | | Second Step | | First Step | | Second Step | | | |
| | Ratio | Temp. (° C.) | Ratio | Temp. (° C.) | Ratio | Temp. (° C.) | Ratio | Temp. (° C.) | Temp. (° C.) | Relaxation (%) |
| Example 18 | 1.4 | 100 | 2.4 | 105 | 1.6 | 100 | 2.4 | 110 | 245 | 2.8 |
| Example 19 | 1.5 | 80 | 2.0 | 98 | 1.1 | 93 | 2.5 | 99 | 252 | 1.2 |
| Example 20 | 1.5 | 120 | 1.7 | 130 | 1.6 | 130 | 1.9 | 140 | 263 | 0 |
| Example 21 | 1.2 | 112 | 2.6 | 114 | 1.3 | 80 | 2.5 | 82 | 258 | 0.4 |
| Example 22 | 1.6 | 148 | 2.1 | 155 | 2.0 | 145 | 2.3 | 160 | 260 | 1.8 |
| Example 23 | 1.1 | 105 | 3.4 | 115 | 1.2 | 115 | 3.2 | 123 | 200 | 4.5 |
| Example 24 | 1.2 | 90 | 2.3 | 96 | 1.4 | 100 | 2.4 | 109 | 180 | 8.2 |
| Example 25 | 1.2 | 100 | 2.8 | 110 | 1.4 | 110 | 2.1 | 120 | 220 | 3 |
| Comparative Example 3 | 1.5 | 100 | 2.0 | 105 | 1.8 | 115 | 2.2 | 120 | 240 | 2 |

Each film was subjected to MD stretching, TD stretching, heat setting and heat relaxation under the conditions shown in Tables 2 to 4. Each of the formed films had a width of 1.8 m, and both edges thereof were trimmed to a width of 1.5 m. Then, both edges were subjected to knurling treatment so as to give knurls having a height of 30 μm and a width of 10 mm. The resulting film having a length of 3000 m was then wound around a core tube having a diameter of 30 cm.

(3) Evaluation of Polyester Films

According to the above-mentioned methods, the surface elastic modulus, the center-line roughness (Ra) and the maximum height (Rt) were measured, and results thereof are described in Tables 5 to 7. The scratch resistance was evaluated according to JIS-K-5400-1990, and measured by the pencil hardness method. This was measured in a state where a film was smoothed out to a flat form, and in a state where a film was rounded to a cylindrical form having a diameter of 10 cm. With regard to the evaluation of scratches, a polyester film after film formation was cut to a size 1.5 m wide and 1 m long, and placed on a black cloth. Then, the number of glittering spots caused by scratches was counted with the naked eye under a 100-W tungsten lamp. Preferred are 10 or less spots, and more preferred are 5 or less spots. Further, the bending resistance was evaluated as an index of the handling characteristics. In this evaluation, a sample film was bent from side to side at an angle of 90 degrees, and the number of bending cycles at which whitening began to occur was counted with the naked eye. Although the permissible range is 50 or more cycles, preferred are 100 or more cycles, and more preferred are 200 or more cycles.

TABLE 5

| | | Evaluation | | | | | | |
|---|---|---|---|---|---|---|---|---|
| | | Surface Elastic Modulus | | | | Scratch Resistance (Pencil Hardness) | | |
| | | GPa | Diff.* GPa | Ra (μm) | Rt (μm) | Flat | Cylindrical | Scratches |
| Example 1 | Layer B Side | 7.2 | 3.6 | 0.0004 | 0.02 | 5H | 5H | 0 |
| | Opposite Side | 3.6 | | 0.0001 | 0.01 | H | H | 0 |
| Example 2 | Layer B Side | 6.0 | 2.2 | 0.0010 | 0.05 | 5H | 5H | 0 |
| | Opposite Side | 3.8 | | 0.0002 | 0.05 | H | H | 0 |
| Example 3 | Layer B Side | 9.8 | 5.6 | 0.003 | 0.15 | 6H | 6H | 0 |
| | Opposite Side | 4.2 | | 0.0001 | 0.03 | H | H | 0 |
| Example 4 | Layer B Side | 6.5 | 3.0 | 0.005 | 0.22 | 5H | 5H | 0 |
| | Opposite Side | 3.5 | | 0.0001 | 0.02 | H | H | 0 |
| Example 5 | Layer B Side | 11.2 | 7.2 | 0.008 | 0.33 | 7H | 7H | 0 |
| | Opposite Side | 4.0 | | 0.0001 | 0.02 | H | H | 0 |
| Example 6 | Layer B Side | 13.5 | 8.3 | 0.0007 | 0.04 | 8H | 8H | 0 |
| | Opposite Side | 5.2 | | 0.0003 | 0.03 | 3H | 3H | 0 |
| Example 7 | Layer B Side | 14.3 | 10.0 | 0.0002 | 0.01 | 8H | 8H | 0 |
| | Opposite Side | 4.3 | | 0.0000 | 0.01 | H | H | 0 |
| Example 8 | Layer B Side | 5.5 | 1.8 | 0.009 | 0.45 | 4H | 4H | 3 |
| | Opposite Side | 3.7 | | 0.0001 | 0.01 | H | H | 2 |
| Example 9 | Layer B Side | 8.5 | 5.1 | 0.0006 | 0.30 | 5H | 5H | 0 |
| | Opposite Side | 3.4 | | 0.0001 | 0.01 | H | H | 0 |
| Comparative Example 1 | Layer B Side | 3.8 | 0.4 | 0.015 | 0.6 | H | B | 15 |
| | Opposite Side | 4.2 | | 0.018 | 0.8 | H | B | 18 |

* Diff.: Difference in Surface Elastic Modulus between the Front and Back Sides

TABLE 6

| | | Evaluation | | | | | | | | | | | |
|---|---|---|---|---|---|---|---|---|---|---|---|---|---|
| | | Surface Elastic Modulus | | Haze | Light Transmit.** | | | Scratch Resistance**** | | | Unevenness in Thickness | | |
| | | GPa | Diff.* GPa | (%) | (%) | Ra (μm) | Rt (μm) | Flat | Cyl*** | | MD (%) | TD (%) | Scratches |
| Example 10 | Layer B Side | 7.4 | 3.8 | 0.6 | 90 | 0.0004 | 0.02 | 5H | H | | 1.3 | 1.8 | 0 |
| | Opposite Side | 3.6 | | | | 0.0001 | 0.01 | H | H | | | 0 | |
| Example 11 | Layer B Side | 6.2 | 2.4 | 1.0 | 88 | 0.001 | 0.05 | 5H | 5H | 1.2 | 2.0 | 0 | |
| | Opposite Side | 3.8 | | | | 0.0002 | 0.05 | H | H | | | 0 | |
| Example 12 | Layer B Side | 9.9 | 5.7 | 0.4 | 94 | 0.003 | 0.15 | 6H | 6H | 0.7 | 1.2 | 0 | |
| | Opposite Side | 4.2 | | | | 0.0001 | 0.03 | H | H | | | 0 | |
| Example 13 | Layer B Side | 6.7 | 3.2 | 1.4 | 82 | 0.005 | 0.22 | 5H | 5H | 1.9 | 2.4 | 0 | |
| | Opposite Side | 3.5 | | | | 0.0001 | 0.02 | H | H | | | 0 | |
| Example 14 | Layer B Side | 11.4 | 7.4 | 0.5 | 92 | 0.008 | 0.33 | 7H | 7H | 1.4 | 1.9 | 0 | |
| | Opposite Side | 4.0 | | | | 0.0001 | 0.02 | H | H | | | 0 | |
| Example 15 | Layer B Side | 13.8 | 9.8 | 1.7 | 75 | 0.0007 | 0.04 | 8H | 8H | 2.5 | 2.9 | 0 | |
| | Opposite Side | 4.0 | | | | 0.0003 | 0.03 | 3H | 3H | | | 0 | |
| Example 16 | Layer B Side | 14.3 | 10.0 | 1.2 | 85 | 0.0002 | 0.01 | 8H | 9H | 1.6 | 2.1 | 0 | |
| | Opposite Side | 4.3 | | | | 0.0000 | 0.01 | H | H | | | 0 | |
| Example 17 | Layer B Side | 5.8 | 2.1 | 1.2 | 83 | 0.009 | 0.43 | 4H | 4H | 1.8 | 2.3 | 3 | |
| | Opposite Side | 3.7 | | | | 0.0001 | 0.01 | H | H | | | 2 | |

TABLE 6-continued

| | | Surface Elastic Modulus | | Haze | Light Transmit.** | | | Scratch Resistance**** | | | Unevenness in Thickness | | |
|---|---|---|---|---|---|---|---|---|---|---|---|---|---|
| | | GPa | Diff.* GPa | (%) | (%) | Ra (μm) | Rt (μm) | Flat | Cyl*** | | MD (%) | TD (%) | Scratches |
| Example 8 | Layer B Side | 5.4 | 1.8 | 2.4 | 67 | 0.009 | 0.45 | 4H | 4H | 5.5 | 7.5 | | 3 |
| | Opposite Side | 3.6 | | | | 0.0001 | 0.01 | H | H | | | | 3 |
| Comparative Example 2 | Layer B Side | 3.8 | 0.4 | 2.2 | 65 | 0.015 | 0.6 | H | B | 1.4 | 1.9 | | 12 |
| | Opposite Side | 4.2 | | | | 0.018 | 0.8 | H | B | | | | 15 |

*Diff.: Difference in Surface Elastic Modulus between the Front and Back Sides
**Light Transmit.: Total Light Transmittance
***Cyl: Cylindrical
****Scratch Resistance: Scratch Resistance (Pencil Hardness)

TABLE 7

| | | Surface Elastic Modulus | | Number of Voids** | Breaking Elongation | | Haze | Light Transmit.*** | | |
|---|---|---|---|---|---|---|---|---|---|---|
| | | GPa | Diff.* GPa | | MD (%) | TD (%) | (%) | | Ra (μm) | Rt (μm) |
| Example 18 | Layer B Side | 8.0 | 4.4 | 12 | 60 | 80 | 0.2 | 94 | 0.0002 | 0.01 |
| | Opposite Side | 3.6 | | | | | | | 0.0001 | 0.01 |
| Example 19 | Layer B Side | 6.7 | 2.9 | 25 | 120 | 140 | 0.7 | 90 | 0.0008 | 0.04 |
| | Opposite Side | 3.8 | | | | | | | 0.0002 | 0.05 |
| Example 20 | Layer B Side | 10.3 | 6.1 | 3 | 30 | 40 | 0.1 | 97 | 0.0025 | 0.11 |
| | Opposite Side | 4.2 | | | | | | | 0.0001 | 0.02 |
| Example 21 | Layer B Side | 7.2 | 3.7 | 70 | 50 | 70 | 1.0 | 85 | 0.002 | 0.18 |
| | Opposite Side | 3.5 | | | | | | | 0.0001 | 0.01 |
| Example 22 | Layer B Side | 12.1 | 8.1 | 5 | 15 | 30 | 0.1 | 97 | 0.007 | 0.31 |
| | Opposite Side | 4.0 | | | | | | | 0.0001 | 0.01 |
| Example 23 | Layer B Side | 13.9 | 9.9 | 85 | 170 | 190 | 1.6 | 80 | 0.0005 | 0.03 |
| | Opposite Side | 4.0 | | | | | | | 0.0003 | 0.02 |
| Example 24 | Layer B Side | 14.0 | 9.7 | 77 | 40 | 50 | 1.2 | 83 | 0.0002 | 0.01 |
| | Opposite Side | 4.3 | | | | | | | 0.0000 | 0.01 |
| Example 25 | Layer B Side | 7.3 | 3.6 | 10 | 45 | 60 | 0.7 | 90 | 0.007 | 0.41 |
| | Opposite Side | 3.7 | | | | | | | 0.0001 | 0.01 |
| Example 8 | Layer B Side | 5.8 | 2.1 | 170 | 5 | 6 | 2.5 | 66 | 0.009 | 0.45 |
| | Opposite Side | 3.7 | | | | | | | 0.0001 | 0.01 |
| Comparative Example 3 | Layer B Side | 3.8 | 0.9 | 120 | 100 | 110 | 2.2 | 65 | 0.015 | 0.5 |
| | Opposite Side | 3.7 | | | | | | | 0.016 | 0.7 |

*Diff.: Difference in Surface Elastic Modulus between the Front and Back Sides
**Number of Voids: Number of Voids Developed
***Light Transmit.: Total Light Transmittance

| | | Scratch Resistance**** | | Unevenness in Thickness | | Bending Resistance | | Thermal Change***** | | |
|---|---|---|---|---|---|---|---|---|---|---|
| | | Flat | Cylindrical | MD μm | TD μm | MD cycles | TD cycles | MD (%) | TD (%) | Scratches |
| Example 18 | Layer B Side | 6H | 6H | 1.2 | 1.2 | 180 | 150 | 0.12 | 0.15 | 0 |
| | Opposite Side | H | H | | | | | | | 0 |
| Example 19 | Layer B Side | 6H | 6H | 1.1 | 1.3 | 150 | 140 | 0.19 | 0.22 | 0 |
| | Opposite Side | H | H | | | | | | | 0 |
| Example 20 | Layer B Side | 7H | 7H | 0.5 | 1.0 | 230 | 250 | 0.07 | 0.09 | 0 |
| | Opposite Side | H | H | | | | | | | 0 |
| Example 21 | Layer B Side | 6H | 6H | 1.7 | 2.0 | 90 | 120 | 0.20 | 0.24 | 0 |
| | Opposite Side | H | H | | | | | | | 0 |
| Example 22 | Layer B Side | 7H | 7H | 1.2 | 1.6 | 310 | 330 | 0.08 | 0.10 | 0 |
| | Opposite Side | H | H | | | | | | | 0 |
| Example 23 | Layer B Side | 8H | 8H | 2.7 | 2.7 | 55 | 70 | 0.22 | 0.27 | 0 |
| | Opposite Side | 3H | 3H | | | | | | | 0 |
| Example 24 | Layer B Side | 8H | 8H | 1.2 | 1.2 | 80 | 90 | 0.21 | 0.25 | 0 |
| | Opposite Side | H | H | | | | | | | 0 |
| Example 25 | Layer B Side | 4H | 4H | 1.3 | 1.2 | 100 | 120 | 0.16 | 0.19 | 2 |
| | Opposite Side | H | H | | | | | | | 2 |
| Example 8 | Layer B Side | 4H | 4H | 5.6 | 7.6 | 20 | 30 | 0.35 | 0.39 | 3 |
| | Opposite Side | H | H | | | | | | | 3 |

TABLE 7-continued

| | | | | Evaluation | | | | | | |
|---|---|---|---|---|---|---|---|---|---|---|
| Comparative Example 3 | Layer B Side | H | B | 1.3 | 1.8 | 30 | 40 | 0.33 | 0.36 | 11 |
| | Opposite Side | H | B | | | | | | | 13 |

****Scratch Resistance: Scratch Resistance (Pencil Hardness)
****Thermal Change: Rate of Thermal Dimensional Change The excellent scratch resistance was attained by the laminated polyester films having a surface elastic modulus of 5 GPa to 15 GPa on at least one side thereof.

Further, the excellent scratch resistance was also attained by the laminated polyester films having a surface elastic modulus of 5 GPa to 15 GPa on at least one side thereof, a total light transmittance of 70% to 98% and a haze of 0% to 2%.

Still further, the excellent scratch resistance, the high optical characteristics and the excellent handling characteristics were attained by the laminated polyester films having a surface elastic modulus of 5 GPa to 15 GPa on at least one side thereof and a number of voids developed of 0 to 100/100 $\mu m^2$.

While the invention has been described in detail and with reference to specific embodiments thereof, it will be apparent to one skilled in the art that various changes and modifications can be made therein without departing from the spirit and scope thereof.

What is claimed is:

1. A laminated polyester film having a surface elastic modulus of 5 GPa to 15 GPa on at least one side thereof.

2. The laminated polyester film according to claim 1, wherein said film has a total light transmittance of 70% to 98% and a haze of 0% to 2%.

3. The laminated polyester film according to claim 1, wherein said film has a number of voids developed of 100 or less per 10 $\mu m$ square.

4. The laminated polyester film according to claim 1, wherein said film has a center-line roughness Ra of 0 $\mu m$ to 0.01 $\mu m$ and a maximum height Rt of 0 $\mu m$ to 0.5 $\mu m$, on the surface on at least one side thereof.

5. The laminated polyester film according to claim 1, wherein a polyester layer containing fine particles having a size of 1 nm to 400 nm in an amount of 10% to 60% by weight is laminated on at least one side of a polyester support.

6. The laminated polyester film according to claim 5, wherein said film has a total layer thickness of 10 $\mu m$ to 300 $\mu m$ and a thickness of the polyester layer containing fine particles having a size of 1 nm to 400 nm in an amount of 10% to 60% by weight of 5 $\mu m$ to 100 $\mu m$.

7. The laminated polyester film according to claim 5, wherein the ratio of the particle size D of the fine particles to the thickness Tb of the polyester layer containing fine particles having a size of 1 nm to 400 nm in an amount of 10% to 60% by weight, D/Tb, is from $10^{-3}$ to $10^{-5}$.

8. The laminated polyester film according to claim 5, wherein the ratio of the particle size D of the fine particles to the thickness Tb of the polyester layer containing fine particles having a size of 1 nm to 400 nm in an amount of 10% to 60% by weight, D/Tb, is from less than $1\times10^{-2}$ to $1\times10^{-5}$.

9. The laminated polyester film according to claim 1, wherein the difference in surface elastic modulus between the front and back sides is from 0.5 GPa to 10 GPa.

10. The laminated polyester film according to claim 1, wherein the polyester is a polyethylene terephthalate resin or a polyethylene naphthalate resin.

11. The laminated polyester film according to claim 1, wherein said film has an unevenness in thickness of 0% to 3% in a machine direction MD and in a transverse direction TD.

12. The laminated polyester film according to claim 1, wherein said film has a breaking elongation of 10% to 200% both in a machine direction MD and in a transverse direction TD.

13. The laminated polyester film according to claim 1, wherein the rate of thermal dimensional change at 100° C. for 30 minutes is from 0% to 0.3% both in a machine direction MD and in a transverse direction TD, and the unevenness in thickness in a machine direction MD and in a transverse direction TD is from 0% to 3%.

* * * * *